US008262290B2

(12) United States Patent
Feldmeier (10) Patent No.: US 8,262,290 B2
(45) Date of Patent: Sep. 11, 2012

(54) BEARING HAVING A POROUS ELEMENT FOR ACCOMMODATING LUBRICANT (75) Inventor: Fritz Feldmeier, Nuremberg (DE)

(73) Assignee: Paul Mueller GmbH & Co. KG Unternehmensbeteiligungen, Nuremberg (DE)

( * ) Notice: Subject to any disclaimer, the term of this patent is extended or adjusted under 35 U.S.C. 154(b) by 934 days.

(21) Appl. No.: 12/225,402

(22) PCT Filed: Mar. 22, 2007

(86) PCT No.: PCT/DE2007/075001
§ 371 (c)(1),
(2), (4) Date: Dec. 12, 2008

(87) PCT Pub. No.: WO2007/110070
PCT Pub. Date: Oct. 4, 2007

(65) Prior Publication Data
US 2010/0316317 A1    Dec. 16, 2010

(30) Foreign Application Priority Data

Mar. 22, 2006   (EP) .................................. 06005847
Jan. 8, 2007    (DE) .................... 20 2007 000 001 U (51) Int. Cl.
*F16C 33/44*   (2006.01)
*F16C 33/66*   (2006.01)
*F16C 33/76*   (2006.01)

(52) U.S. Cl. ......... 384/470; 384/469; 384/477; 384/607

(58) Field of Classification Search .................. 384/463, 384/469–470, 477, 488–490, 526–527, 564, 384/576, 607; 277/442, 596
See application file for complete search history.

(56) References Cited

U.S. PATENT DOCUMENTS

| 3,639,017 | A | * | 2/1972 | Schoen et al. ................ 384/470 |
| 3,645,592 | A |   | 2/1972 | Flandrena |
| 4,286,829 | A | * | 9/1981 | Heemskerk .................. 384/469 |
| 4,365,851 | A | * | 12/1982 | Andres et al. ................. 384/465 |
| 4,571,097 | A | * | 2/1986 | Lee et al. ...................... 384/571 |
| 4,601,592 | A | * | 7/1986 | Jatczak et al. ................ 384/564 |
| 5,004,359 | A | * | 4/1991 | Jacobson ...................... 384/526 |
| 5,399,026 | A | * | 3/1995 | Witte ............................ 384/463 |
| 5,513,918 | A | * | 5/1996 | Wan ............................. 384/477 |
| 5,529,401 | A | * | 6/1996 | Gabelli et al. ................. 384/470 |
| 6,068,407 | A | * | 5/2000 | Kobayashi et al. ........... 384/488 |
| 6,616,336 | B1 |  | 9/2003 | Sayles et al. |

FOREIGN PATENT DOCUMENTS

| DE | 43 29 398 |   | 7/1994 |
| EP | 0 654 613 |   | 5/1995 |
| FR | 2 444 225 |   | 7/1980 |
| JP | 63225730 A | * | 9/1988 |
| JP | 2007064299 A | * | 3/2007 |

* cited by examiner

*Primary Examiner* — Marcus Charles
(74) *Attorney, Agent, or Firm* — Collard & Roe, P.C.

(57) ABSTRACT

A bearing element 7 has rolling bodies 3, having an inner raceway, an outer raceway and adjacent rolling bodies 3 which are arranged rotatably between the inner and the outer raceways via a cage 4 for holding the rolling bodies 3. At least one porous element 6, 13, 16 is provided for accommodating lubricant for the bearing element 7.

10 Claims, 9 Drawing Sheets

BEARING HAVING A POROUS ELEMENT FOR ACCOMMODATING LUBRICANT

CROSS REFERENCE TO RELATED APPLICATIONS

This application is the National Stage of PCT/DE2007/075001 filed on Mar. 22, 2007, which claims priority under 35 U.S.C. §119 of European Application No. 06 005 847.6 filed on Mar. 22, 2006 and German Application No. 20 2007 000 001.4 filed Jan. 8, 2007. The international application under PCT article 21(2) was not published in English.

BACKGROUND OF THE INVENTION

1. Field of the Invention

The invention relates to a bearing element with rolling bodies, with an inner raceway, an outer raceway and adjacent rolling bodies arranged rotatably between the inner and the outer raceways.

2. The Prior Art

Rotating machine parts generally move at a rotational speed with respect to the surroundings at which they are fastened. The connection is a rotatable bearing which, at high rotational speeds, is customarily a known type of rolling bearing. In order to maintain the rotatability over the long term, the bearings have to be lubricated. In most applications, the outer part of the bearing, the outer bearing ring, is fixed in the housing, and the rotating machine part, generally the shaft, rotates together with or without the inner bearing ring.

The differences in speed between the outer and inner bearing rings of the bearing result in a different pressure composition in air boundary layers close to the surface.

According to the continuity equation for flowing media (Bernoulli's law), a higher static pressure prevails at the outer bearing ring, which is a standstill or moves slowly, then at the inner bearing ring which rotates rapidly. This has the effect that, in the boundary layer region of the inner bearing ring, there is a suction effect in the bearing interior while the ambient pressure prevails in the boundary protection region of the outer bearing ring.

By means of the centrifugal force of the air layer rotating together with the inner bearing ring, reinforced by the rolling bodies which likewise rotate at the same time, a type of radial fan is formed, as a result of which the air is pressed counter to the pressure drop according to Bernoulli to the outer bearing ring and flows off to the outside.

At the laterally sealed bearing point, at which the lateral sealing disk bears tightly against the outer bearing ring, the air flows back radially again in the direction of the inner bearing ring such that a flow component forms in the bearing interior, this flow component, seen by itself, rotating in an opposed manner in the intermediate space between inner and outer bearing rings on both sides of the ring of rolling bodies, but rotating parallel to the axis of the shaft.

This flow is combined with the tangential component caused by the rotation, such that the starting point is a helical movement of air on both sides of the bearing point. This flow with the pressure differences associated therewith can be used for transporting lubricant in the bearing.

SUMMARY OF THE INVENTION

The invention is based on the problem of providing a bearing having particularly advantageous lubrication properties.

This problem is solved by the features of a bearing element with rolling bodies, with an inner raceway, an outer raceway and adjacent rolling bodies arranged rotatably between the inner and the outer raceways, the rotatable arrangement between the inner and outer raceways occurring via a cage for holding the adjacent rolling bodies, wherein at least one porous element is provided for accommodating lubricant for the bearing element. Advantageous variants of the device are also described herein.

The bearing element according to the invention has open-pore and gas-permeable, porous elements, either fastened laterally or in the intermediate space of the outer and inner bearing rings, which elements are connected directly to the bearing ring which is stationary or rotates more slowly. The porous elements can be composed of a sponge-like, absorbent material based on textiles or plastic, or of metal wool, sintered material or metal foam.

The porous elements are impregnated with a lubricant which is optimally suitable for the specific use of the bearing (for example having a low surface tension and good flowability). The air flowing past and the sometimes considerable pressure differences, which are generated by the centrifugal forces, between the outer and inner bearing rings transport the lubricant into the region of contact of the rolling bodies with the bearing rings.

The escaped air which is to be supplemented is sucked into the bearing through an annular gap between rotating shaft and porous elements or through the lateral covering. By means of suitable structural measures (for example selection of the pore size), the transported quantity of lubricant can be adjusted.

Similarly, by means of suitable configuration of the cage (rolling body cage), the ventilator device in the bearing can be influenced. The rolling body cage can be configured in such a manner that the lubricant is directed in a specific manner into the contact region of the rolling bodies and into the raceway.

BRIEF DESCRIPTION OF THE DRAWINGS

The invention is explained further with reference to an exemplary embodiment in the figures of the drawing, in which.

DETAILED DESCRIPTION OF THE PREFERRED EMBODIMENTS

Figure 1:
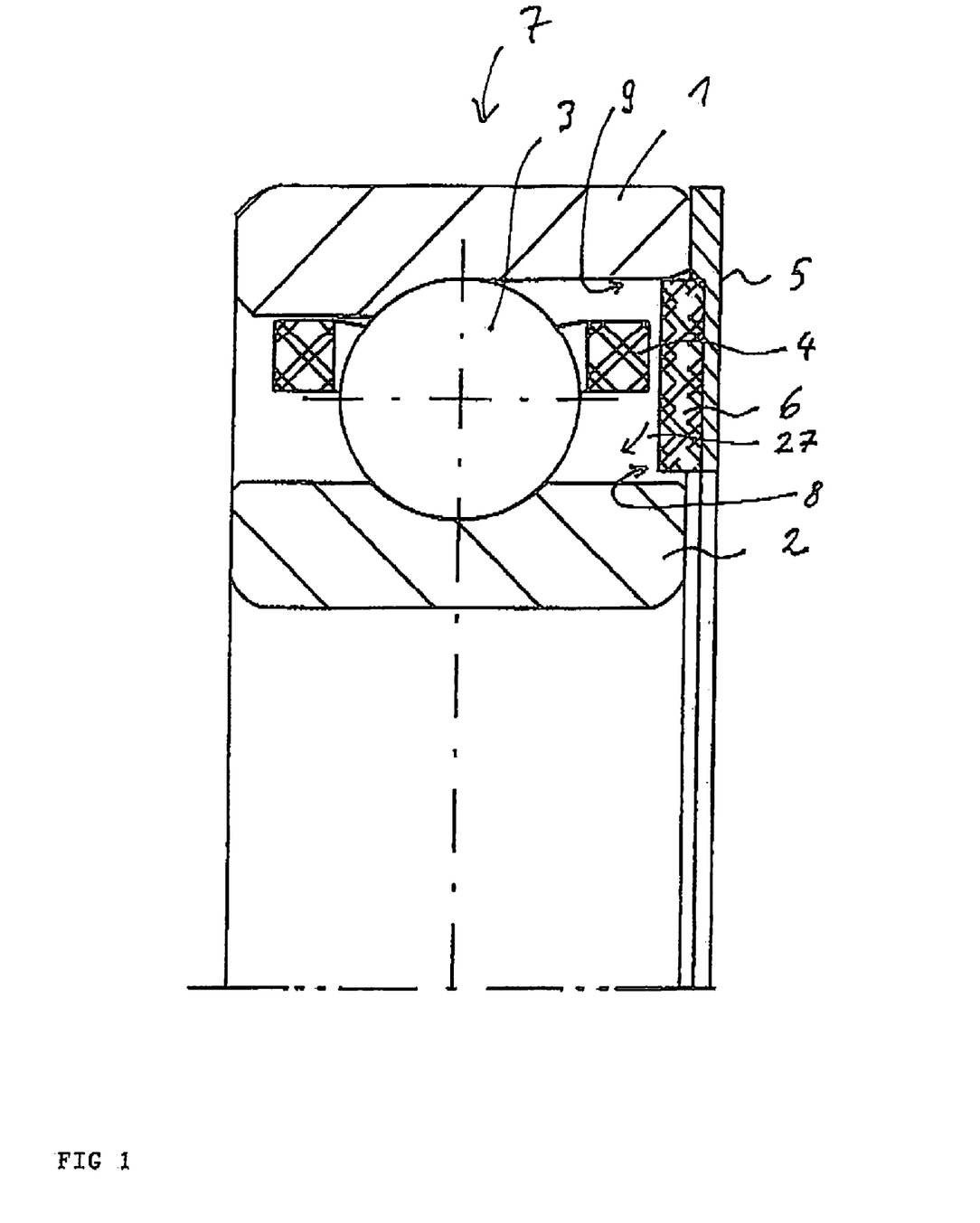
FIG. 1 Shows a schematic sectional illustration of a first embodiment of a bearing element, FIG. 2 Shows a schematic sectional illustration of a further embodiment of a bearing element, FIG. 3 Shows a schematic sectional illustration of a further embodiment of a bearing element, FIG. 4 Shows a schematic sectional illustration of a further embodiment of a bearing element, FIG. 5 Shows a schematic sectional illustration of a further embodiment of a bearing element, FIG. 6 Shows a schematic sectional illustration of an embodiment of a cage of a bearing element, FIG. 7 Shows a schematic sectional illustration of a further embodiment of a cage of a bearing element, FIG. 8 Shows a schematic sectional illustration of a further embodiment of a cage of a bearing element, FIG. 9 Shows a schematic sectional view IX-IX from FIG. 8, and FIG. 10 Shows a sectional illustration of a further embodiment of a bearing element.

FIG. 1 shows a bearing element 7 with an outer ring 1, an inner ring 2, rolling bodies 3 and a cage 4 (rolling body spacer).

The bearing element 7 furthermore has a laterally arranged, revolving ring 5 (for example spacer ring). An in particular revolving, porous element 6, the pores of which are filled with liquid lubricant (for example oil) is fitted on the ring 5.

During rapid rotation, for example of the inner ring 2, a pressure which is lower than the ambient pressure $p_0$ by the speed pressure $p_v$ from the internal rotation prevails in the boundary layer 9 such that air is sucked out of the surroundings into the bearing element 7 through the gap 8.

Since the outer ring 1 does not rotate, the ambient pressure $p_o$ prevails in the boundary layer 9, the ambient pressure $P_o$ being increased by the pressure $p_z$ from the centrifugal acceleration from rotation of the inner ring and rotation of the rolling bodies 3 and the cage 4. During customary operating conditions of the bearing, $p_z$ rom the centrifugal acceleration is higher than $p_v$ such that the air flows to the outside past the rolling bodies 3 and is deflected toward the ring 5. In the boundary layer of the spacer ring 5, including the porous element 6, $p_o$ prevails, and therefore, because of the pressure difference $p_z+p_v$, the air flows along the porous ring 6 radially in the direction 27 and transports lubricant with it from the porous element 6, the lubricant migrating in the direction of the rolling bodies 3.

After flowing through the cage 4, the lubricant is collected in the boundary layer 9 and is transported back into the porous ring 6. An internal lubricant circuit is therefore produced. The porous element 6 can also be arranged on both sides (not depicted).

Figure 2:
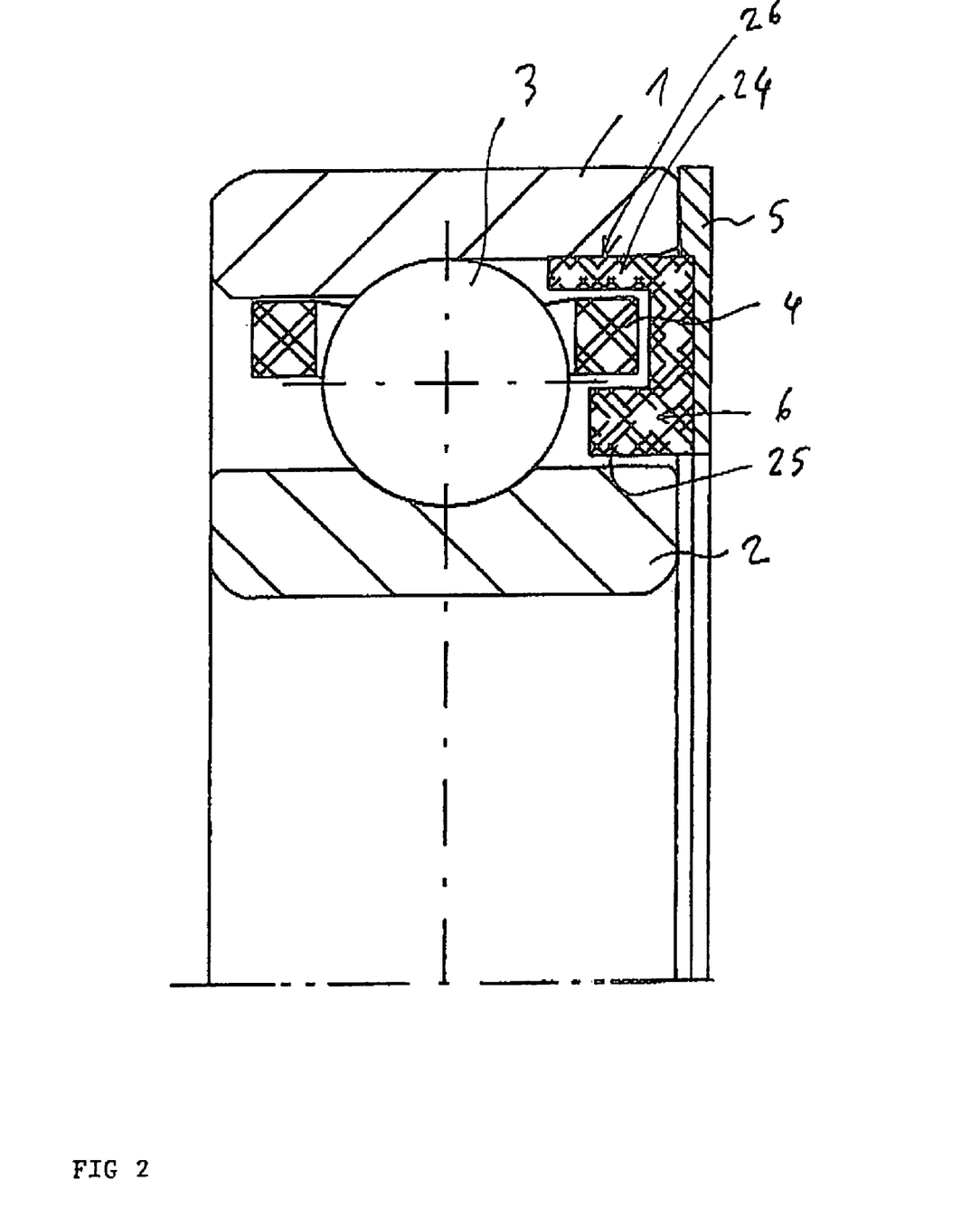

In FIG. 2, the ring 6 composed of porous material is provided with axial extensions 24 and 25 which surround the cage 4 radially on the outside and inside.

The outer extension 24 of the porous element 6 has a minimal radial gap 26 with respect to the inside diameter of the outer ring 1 or is fixed in the outer ring 1 only at a few centering points or with a narrow outer centering collar.

The capillary effect in the narrow gap 26 conveys oil outward out of the porous element 6 in the direction of the rolling body running surface and, if the bearing is not rotating or is rotating slowly, ensures a lubricating film in the contact region of the rolling body 3 and the running surface of the ring.

Figure 3:
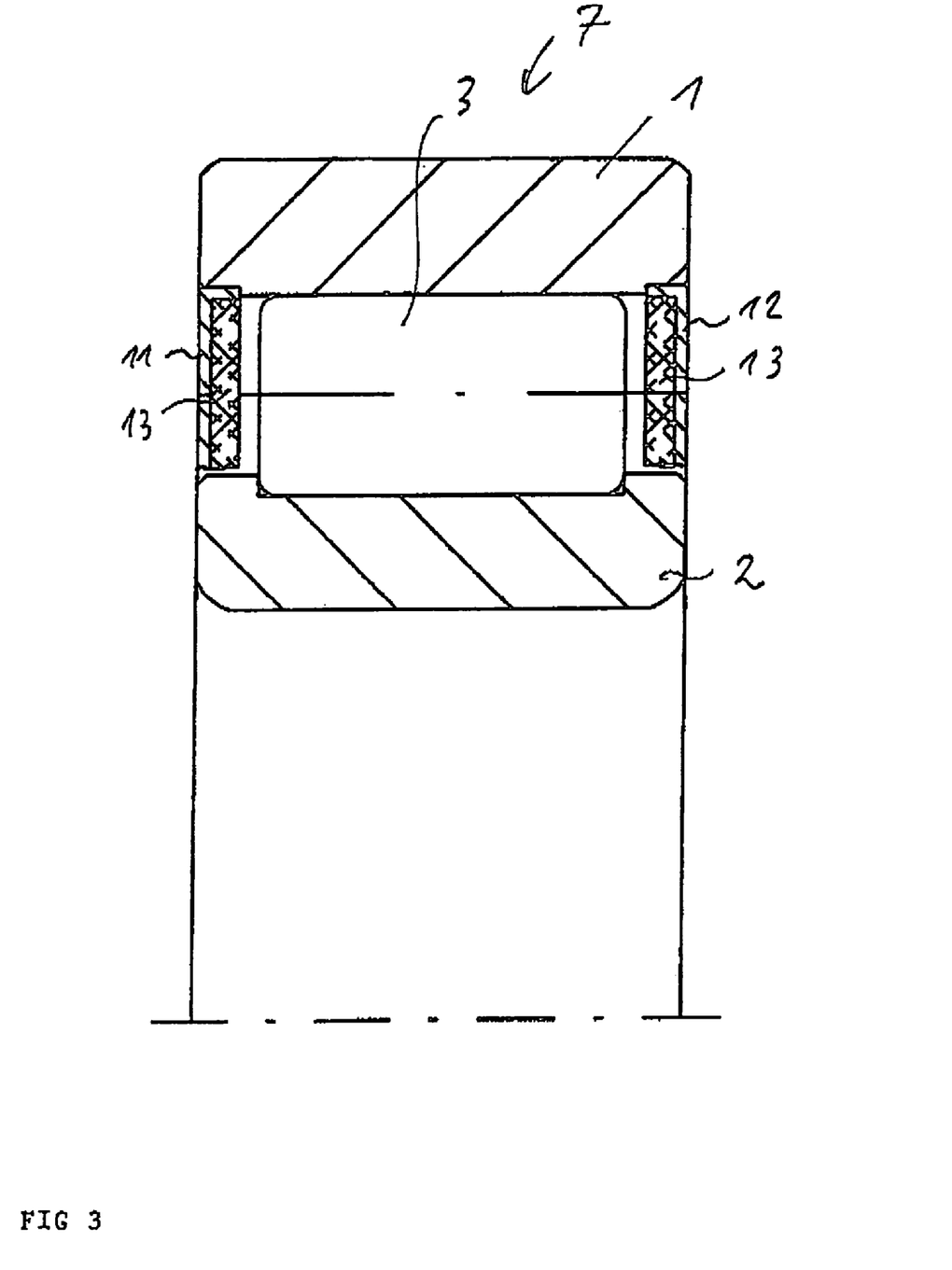

FIG. 3 shows, using the example of a cylindrical roller bearing as the bearing element 7, the use of rings (sealing disks) 11 and 12 which are arranged on both sides, are directed toward the rolling body 3 and are provided with porous elements 13. The sealing disks 12 are pressed into the ring diameter of the outer ring 1.

Figure 4:
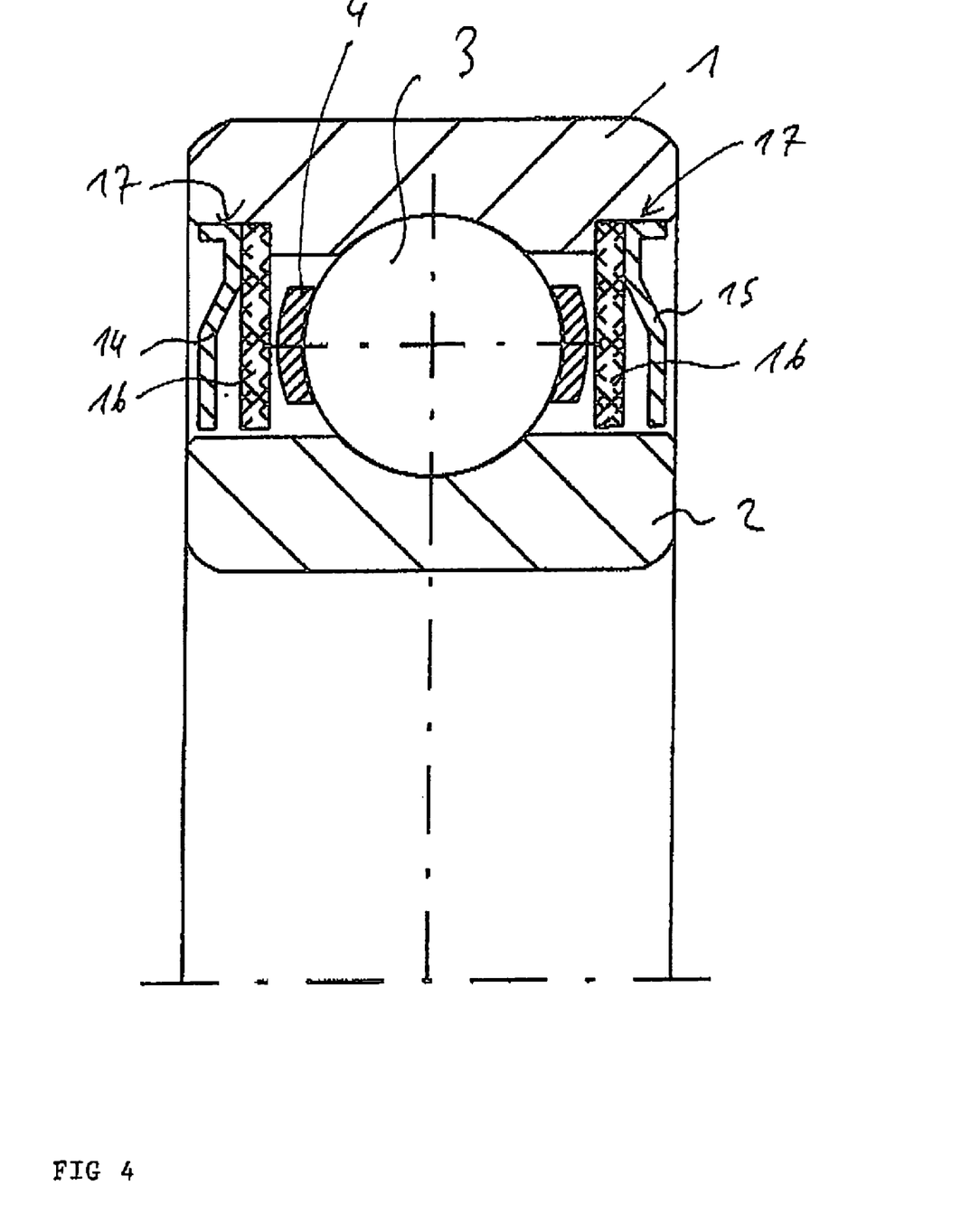

FIG. 4 shows, using the example of deep groove ball bearings sealed on both sides, the use of separate, porous elements 16 which are pressed into the internal ring diameter 17 of the outer ring. The bearing is equipped with a cage 4, and the rings (sealing disks) 14 and 15 prevent dirt from penetrating, and the escape and therefore loss of lubricant.

Figure 5:
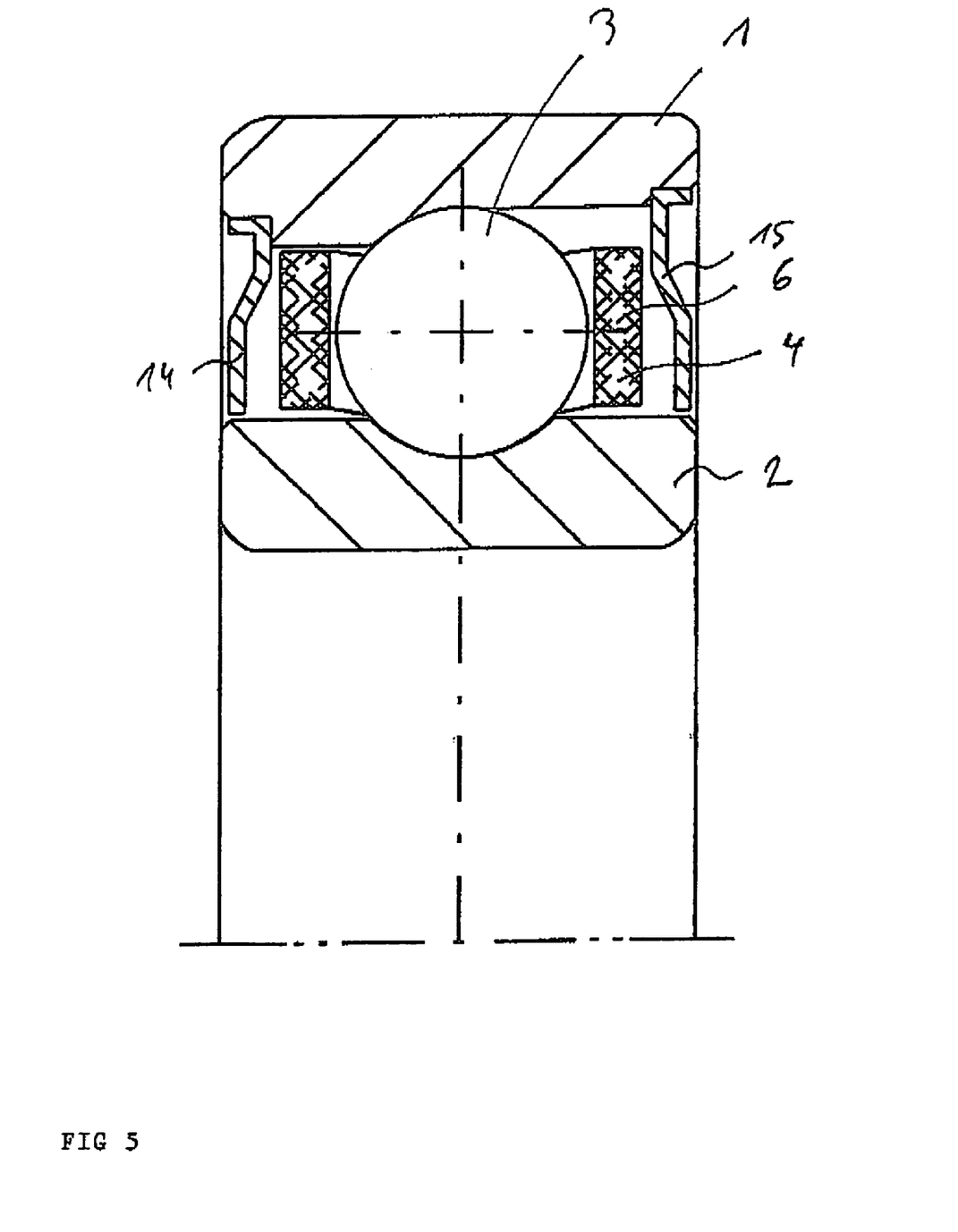

In FIG. 5. the cage 4 is designed as a porous element 6 and is composed of porous material, for example having a metallic fiber structure, or a hollow ball structure of open-pore metal foam. The cage 4 largely fills the intermediate space between outer ring 1 and inner ring 2. The loss of lubricant is prevented by the rings 14 and 15.

Figure 6:
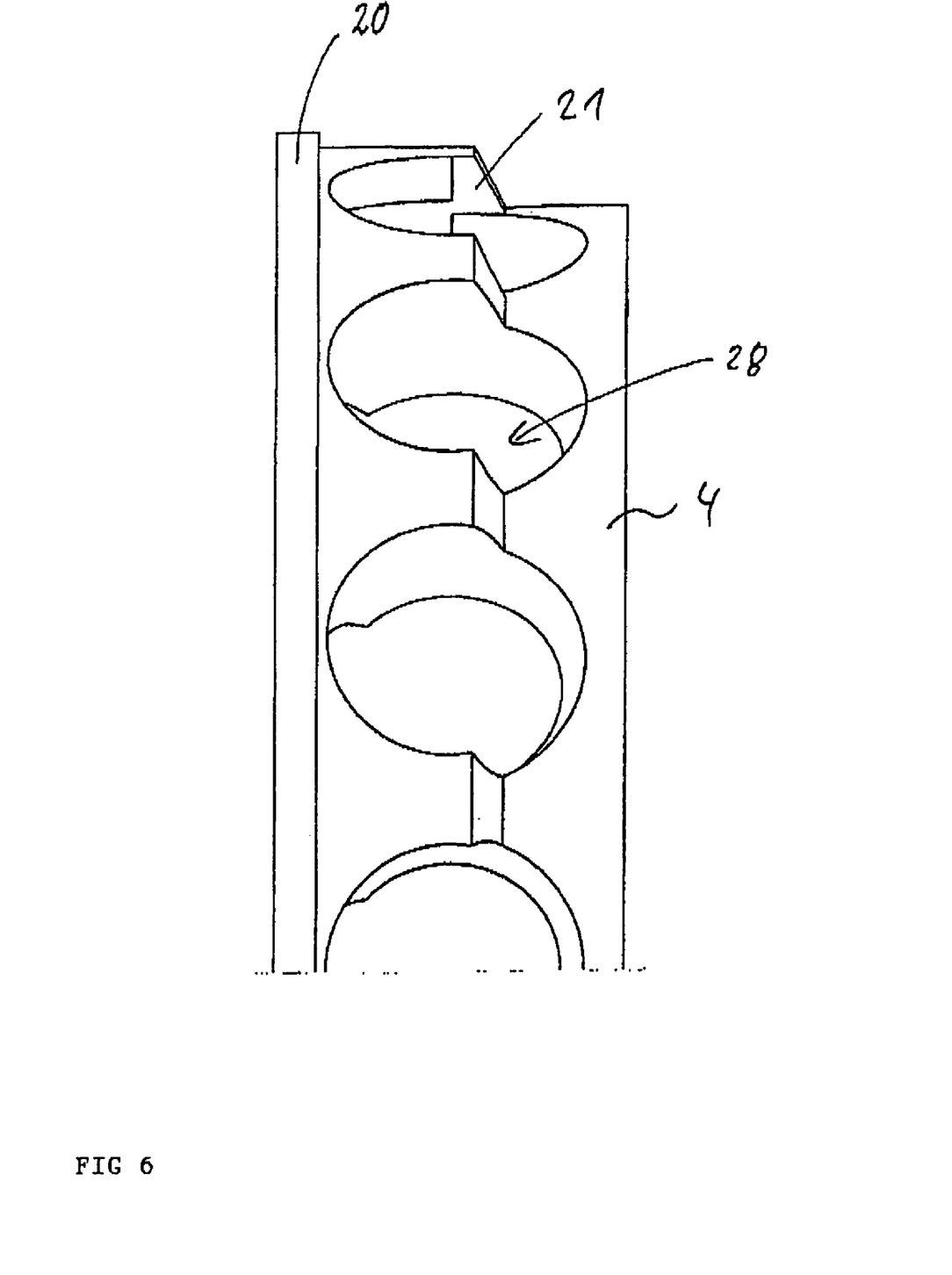

The cage 4 in FIG. 6 is guided on one side by the centering collar 20 against the ring diameter of the outer ring and, in the rolling bearing region at the webs 23 between the openings (ball pocket) 28, has short projections 21 which are configured in a manner favorable for flow and which additionally radially accelerate the air conducted through openings 28 and therefore concentrate the flow of lubricant in the rolling bearing region.

Figure 7:
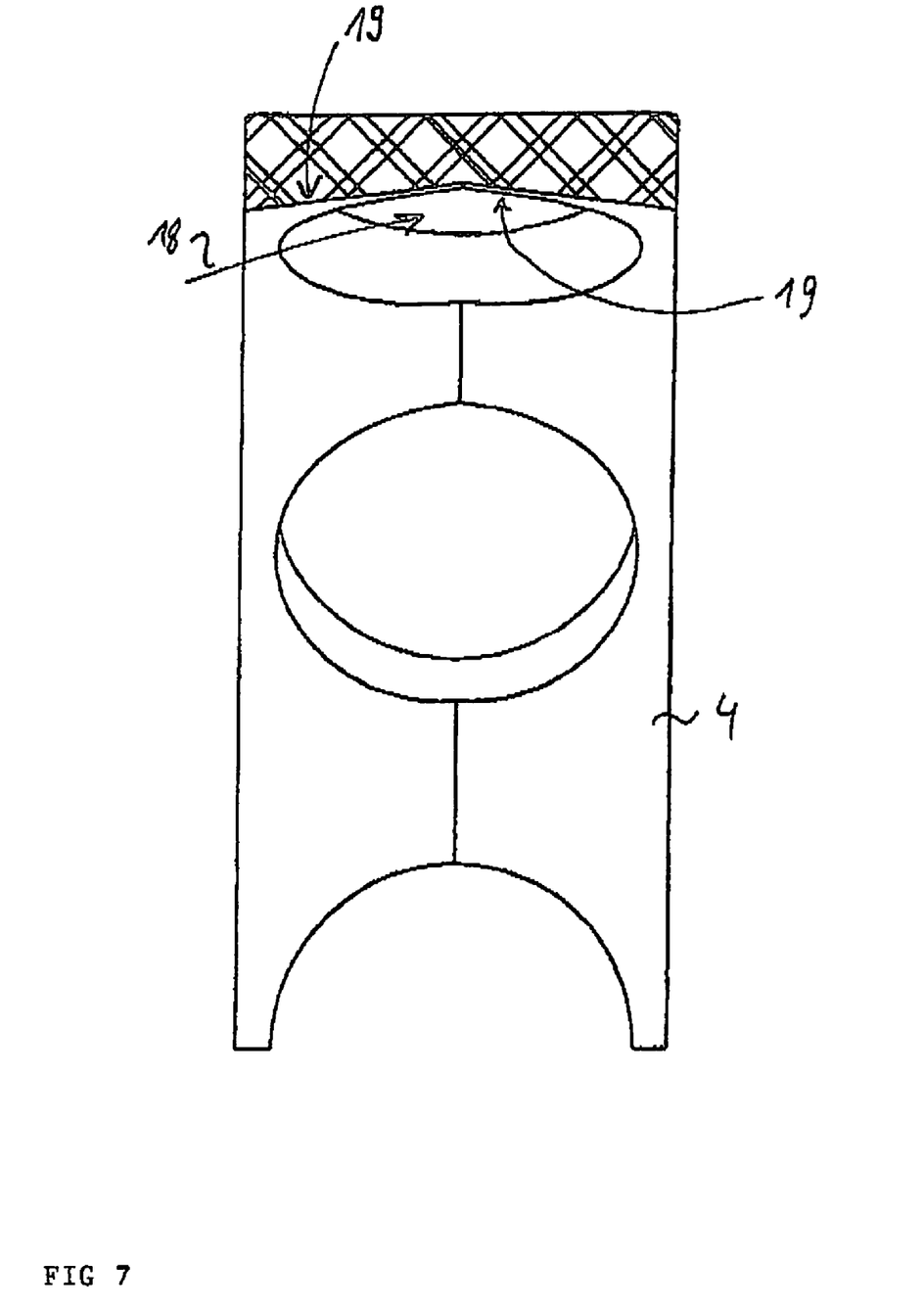

FIG. 7 shows an advantageous embodiment of the cage 4, in which the tapered portion 19, which is conical toward the center of the cage, conducts the lubricant supplied in the direction 18 into the region of contact of the rolling bodies 3 (not depicted) and raceway of the outer ring 1 (not depicted).

Figure 8:
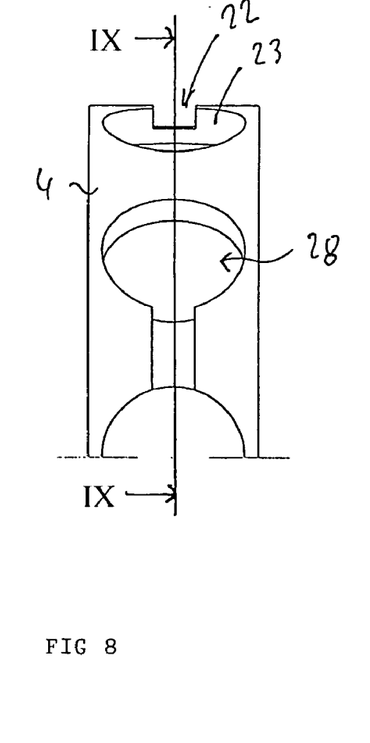
Figure 9:
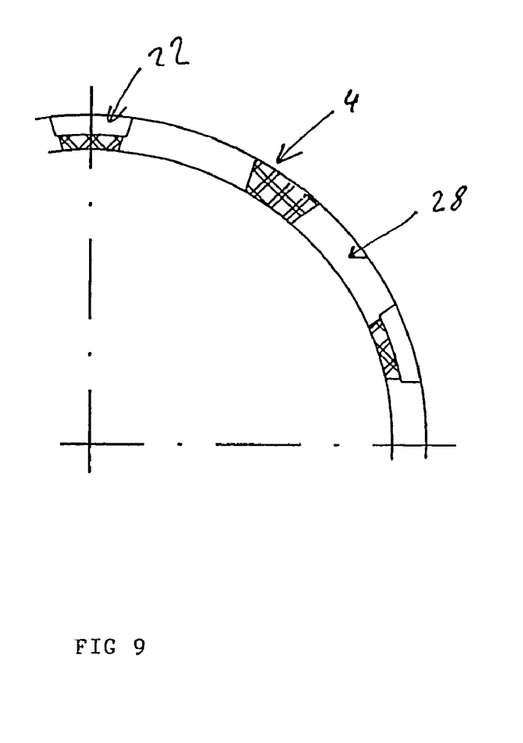

In the case of cage 4 according to FIG. 8 and FIG. 9, every second web 23 between the openings 28 is shortened radially at the narrowest point, for example by means of notches 22, in order to increase the conveying effect of the air in the apex of the ball and therefore to concentrate the flow of lubricant.

Cylindrical, hollow machine elements can be provided with sealing covers. The connection of such thin circular disks or rings to the surrounding part is produced by pressing in, flanging, adhesive bonding, snapping in or by means of an additional retaining ring, for example a snap ring.

If sealing covers of this type are to be removable and reusable, then frictional connections are suitable, i.e. press connections, or form-fitting solutions are suitable, in which the outer edge of the sealing cover is snapped into a circumferential groove of the cylindrical machine part or is prevented from falling out by means of a retaining ring, for example a snap ring.

Such a connection of thin-walled surrounding parts is often intended, as far as possible, not to deform the receptacle, and is intended to seal the receptacle in a liquid- and air-tight manner, to reduce the interior space as little as possible and/or not to protrude over the end side of the component.

A solution for meeting these requirements is described using the example of a sealed rolling bearing.

Figure 10:
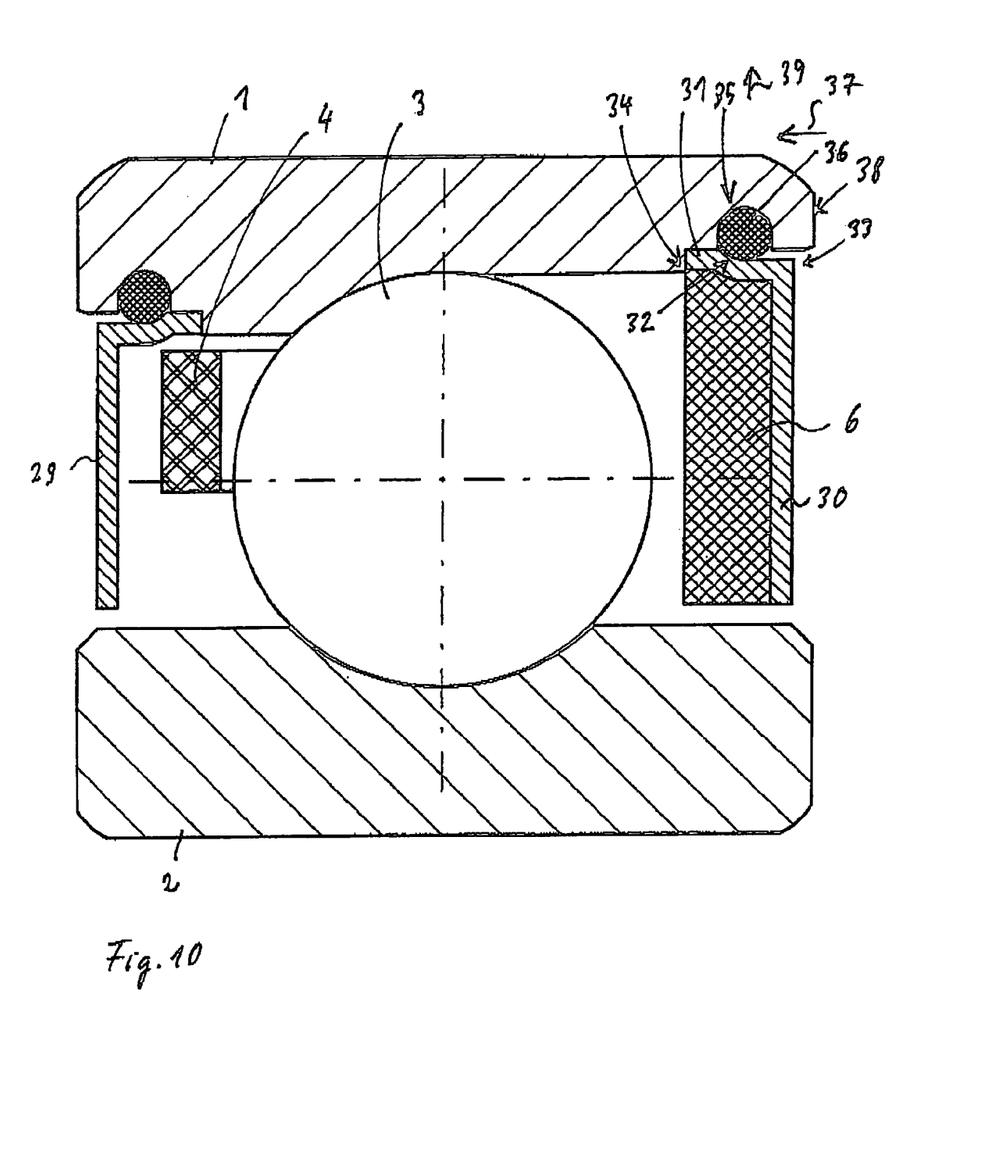

As illustrated in FIG. 10 (sectional illustration), a bearing element (for example rolling bearing) comprises an outer bearing ring (outer ring) 1, an inner bearing ring (inner ring) 2, and the rolling bodies 3 which are arranged in between and can be guided in a cage 4.

In order to protect the bearing from soiling and to keep the lubricant required for the long-term operation in the bearing, lateral sealing covers 29 and/or 30 are provided, which sealing covers can hold a porous element 6, which is fitted thereon, in order to accommodate lubricant.

The sealing cover 29, 30 according to the invention is an encircling, for example thin-walled, cup-shaped ring which, on its outer wall (cup wall) 31, has a small cylindrical step 32 toward the open side.

A depression 33 is provided on the end side of the outer bearing ring 1. The depression 33 is at least of such a depth axially in the direction 37 that the sealing cover 29, 30 does not protrude over the end side 38 of the outer bearing ring 1.

A shoulder 34 of the outer bearing ring 1 results in secure axial contact for the cup wall 31. At the correct distance from the end side 38 of the outer bearing ring 1, a groove 35 for receiving a ring (toroidal sealing ring or O ring) 36 is incorporated radially in the direction 39.

The insertion depth of the groove 35 is selected in such a manner that a secure and direct snap connection to the sealing cover 29 and/or 30 is produced without deforming the bearing ring 1. The toroidal sealing ring can be matched in its spring hardness to the requirements by suitable selection of the material.

The sealing cover 29, 30 can be removed mechanically or magnetically without being destroyed and can be reused.

The figure illustrates the left half of a rolling bearing with a cage for accommodating the rolling bodies, and the right half of a bearing with a full ring of rolling bodies with the circumference filled without a gap, or with a (crown-shaped) snap-type cage which is open on one side. In the embodiment last mentioned, there is a particularly large amount of free space for the lubrication.

Reference Numbers

1 Outer ring
2 Inner ring
3 Rolling bodies
4 Cage
5 Spacer ring
6 Porous element
7 Bearing element
8 Gap
9 Boundary layer
10 Bearing ring
12 Ring
13 Porous element
14 Sealing disk
15 Sealing disk
16 Porous element
17 Inner ring
18 Direction
19 Tapered portion
20 Centering collar
21 Projection
22 Notch
23 Web
24 Extension
25 Extension
26 Gap
27 Direction
28 Opening
29 Sealing cover
30 Sealing cover
31 Wall
32 Step
33 Depression
34 Shoulder
35 Groove
36 Ring
37 Direction
38 End side
39 Direction

The invention claimed is:

1. A bearing element with rolling bodies, with an inner raceway, an outer raceway and adjacent rolling bodies arranged rotatably between the inner and the outer raceways via a cage for holding the adjacent rolling bodies,
    wherein at least one porous element is provided for accommodating lubricant for the bearing element, and
    wherein every second web between the openings of the cage is shortened radially at the narrowest point.

2. The bearing element as claimed in claim 1, wherein the at least one porous element is fitted in an intermediate space between an outer ring and an inner ring of the bearing element.

3. The bearing element as claimed in claim 1, wherein the at least one porous element is fitted on the cage of the bearing element.

4. The bearing element as claimed in claim 1, wherein the cage of the bearing element forms the at least one porous element and is partially or completely composed of porous material.

5. The bearing element as claimed in claim 1, wherein the cage of the bearing element has a shape which is optimized in terms of flow.

6. The bearing element as claimed in claim 1, wherein a gap for supplying lubricant and for forming a lubricant flow is provided between the at least one porous element and an outer ring or an inner ring of the bearing element.

7. The bearing element as claimed in claim 1, further comprising a sealing cover.

8. The bearing element as claimed in claim 7, wherein the at least one porous element is fitted on the sealing cover.

9. The bearing element as claimed in claim 7, wherein the sealing cover is a cup shaped ring.

10. The bearing element as claimed in claim 9, wherein the sealing cover can be fitted on the bearing element via the cup-shaped ring.

\* \* \* \* \*